United States Patent [19]

Ota et al.

[11] Patent Number: 5,043,379

[45] Date of Patent: Aug. 27, 1991

[54] PLASTISOL COMPOSITION

[75] Inventors: Tatsuro Ota; Tsuguo Ogawa, both of Nara, Japan

[73] Assignee: Kypeisha Chemical Co., Ltd., Osaka, Japan

[21] Appl. No.: 445,988

[22] Filed: Nov. 22, 1989

[51] Int. Cl.$^5$ ............................................. C08L 27/06
[52] U.S. Cl. ................................. 524/507; 524/569; 524/549; 524/590; 528/45
[58] Field of Search ............... 524/569, 589, 590, 507; 528/45

[56] References Cited

U.S. PATENT DOCUMENTS 4,477,624 10/1984 Waki .................................. 524/590
4,623,686 11/1986 Hürnik et al. ........................ 524/569

FOREIGN PATENT DOCUMENTS 249884 12/1987 European Pat. Off. .............. 528/45

Primary Examiner—Morton Foelak
Assistant Examiner—Dennis R. Daley
Attorney, Agent, or Firm—Wenderoth, Lind & Ponack

[57] ABSTRACT

A plastisol composition containing a vinyl chloride type polymer, a plasticizer, an adhesiveness-improving agent and a thermal dissociation-promoting agent, wherein the adhesiveness-improving agent is an aromatic diisocyanate polymer randomly blocked with at least two different members selected from the group consisting of monoalkylphenols and dialkylphenols.

5 Claims, No Drawings

PLASTISOL COMPOSITION

This invention relates to a plastisol composition, more particularly to a plastisol composition optimally used for adhesive agents, sealants, and coating materials in the automobile industry and various other industries.

In the field of plastisol compositions, the practice of incorporating in a given plastisol composition an organic polyisocyanate type compound as a means of enhancing the adhesiveness of the plastisol composition to a steel sheet or an undercoat has found recognition.

Japanese Patent Application Disclosure SHO 57(1982)-105,441, for example, discloses the addition to a plastisol composition of an isocyanate polymer obtained by converting tolylene diisocyanate or diphenyl methane diisocyanate into a cyanurate and polymerizing the cyanurate. Japanese Patent Publication SHO 59(1984)-52,901 and Japanese Patent Application Disclosure SHO 59(1984)-120651 disclose the addition of a blocked polyurethane prepolymer which has an isocyanate group blocked with an oxime or a lactam. Further, Japanese Patent Application Disclosure SHO 57(1982)-131,669 discloses the addition of a lactam-blocked polyisocyanate and Japanese Patent Application Disclosure SHO 62(1987)-41,278 discloses the use of a long-chain alkylphenyl-blocked aromatic diisocyanate polymer.

The plastisol composition of Japanese Patent Application Disclosure SHO 57(1982)-105,441 mentioned above contains free isocyanate (NCO) groups at the terminals thereof and, consequently, exhibits high reactivity, has dubious stability, and suffers from the drawback of a short shelf life. In the plastisol composition incorporating therein the aforementioned blocked polyisocyanate compound, the blocking agent used therein necessitates such a high temperature as in the range of 180° to 220° C., for example, for the purpose of dissociation thereof. As a measure for eliminating the impact of the elevated temperature, the addition of a thermal dissociation-promoting agent has been proposed. When a polyamide containing active amino groups is added as the thermal dissociation-promoting agent, however, the coating made of the plastisol composition has the disadvantage that it is susceptible to discoloration and deficient in waterproofness. Further, the addition of this or other thermal dissociation-promoting agent does not impart fully satisfactory adhesiveness to the coated surface of metal (such as, for example, the coating formed on a steel sheet by cationic electrodeposition). This insufficiency of adhesiveness is conspicuous when the coating formed by the cationic electrodeposition has a large thickness.

This invention, therefore, aims to provide a plastisol composition which is improved to eliminate the impact of the imperfection of the conventional plastisol compositions and is allowed by a heat treatment performed at a relatively low temperature for a short period to adhere fast to the coated surface of metal, particularly a coating of large thickness formed by cationic electrodeposition, and to form a coating having excellent waterproofness and being insusceptible to thermal discoloration, and which has excellent storage stability.

The inventors, after a diligent study, have found that the plastisol composition acquires improved adhesiveness and consequently will adhere fast to the coating formed particularly in large thickness by cationic electrodeposition, by using mono- and di-alkyl phenols as a blocking agent for the polymer resulting from the conversion of an aromatic diisocyanate into a cyanurate, and then using as an adhesiveness-improving agent an aromatic diisocyanate polymer randomly blocked with the blocking agent.

To be specific, this invention is directed to a plastisol composition which comprises a vinyl chloride type polymer, a plasticizer, an adhesiveness-improving agent, and a thermal dissociation-promoting agent, providing that the adhesiveness-improving agent is an aromatic diisocyanate polymer randomly blocked with an alkyl phenol blocking agent comprising at least two members selected from the group consisting of mono- and di-alkylphenols.

This invention will now be described more specifically. As the vinyl chloride type polymer to be used in the plastisol composition of this invention, any of the vinyl chloride type polymers heretofore available for the conventional plastisol compositions can be adopted. These polymers include homopolymers and copolymers of vinyl chloride. The monomers copolymerizable with vinyl chloride and, therefore, usable in forming vinyl chloride copolymers include vinyl esters such as vinyl acetate, vinyl propionate, and vinyl stearate, (meth)acrylic esters such as methyl (meth)acrylates, ethyl (meth)acrylates, butyl (meth)acrylates, 2-hydroxyethyl (meth)acrylates, and 2-hydroxypropyl (meth)acrylates, maleic esters such as diethyl maleate and dibutyl maleate, phtha fumaric esters such as diethyl fumarate and dibutyl fumarate, and vinyl ethers such as vinylmethyl ether and vinylbutyl ether, for example. These vinyl chloride polymers and copolymers are effectively used in a form having a polymerization degree in the range of 500 to 2,000. Such polymers and copolymers are generally available on the market. Concrete examples of the commercially available vinyl chloride type polymers are Zeon 121 and 37J (trademark designations of Nippon Zeon Co., Ltd.), Kane Vinyl RSL-10, PSH-10, PSM-80, and PCH-12 (trademark designations of Kanegafuchi Chemical Industry, Co., Ltd.), and Denka Vinyl PA-1000 and ME-180 (trademark designation of Electro Chemical Industry Co., Ltd.). These vinyl chloride type polymers may be used either singly or in the form of a mixture of two or more members.

As the plasticizer to be used in this invention, any of the plasticizers generally used for the purpose contemplated herein can be adopted without any specific restriction. The plasticizers which are usable effectively herein include phthalic acid type plasticizers such as di-n-octyl phthalate (DOP), di-2-ethylhexyl phthalate, diisononyl phthalate (DINP), and diheptyl phthalate (DHP), fatty acid ester type plasticizers such as di-2-ethylhexyl adipate (DOA), di-2-ethylhexyl azalate, and di-2-ethylhexyl sebacate, and phosphoric acid ester type plasticizers such as tributyl phosphate and tri-2-ethylhexyl phosphate, for example. From these plasticizers, the plasticizer actually used is selected depending on the properties required such as, for example, stability and hardening property of the plastisol composition and hardness, heatproofness, and compatibility of the hardened plastisol composition. These plasticizers may be used either singly or in the form of a mixture of two or more members. The amount of the plasticizer to be used is desirably in the range of 30 to 300 parts by weight, based on 100 parts by weight of the vinyl chloride type polymer. Optionally, part of the plasticizer may be substituted with a paraffin type solvent such as dodecyl benzene or mineral turpentine as occasion demands.

The plastisol composition of this invention, for the improvement of the adhesiveness thereof, must contain an aromatic diisocyanate polymer randomly blocked with an alkylphenol blocking agent comprising at least two members selected from the group consisting of monoalkyl- and dialkyl-phenols.

The aromatic diisocyanates (monomers) which are usable for the formation of the aromatic diisocyanate polymer to be used in the present invention include tolylene diisocyanate, diphenyl methane diisocyanate, and xylylene diisocyanate, for example. These aromatic diisocyanates (monomers) may be used either singly or in the form of a mixture of two or more members. Optionally, part of the aromatic diisocyanate may be substituted with an aliphatic diisocyanate such as hexamethylene diisocyanate or an alicyclic diisocyanate such as isophorone diisocyanate.

The aromatic diisocyanate polymer is desirably prepared by polymerizing the aforementioned diisocyanate compound in the aforementioned plasticizer which is used in the plastisol composition of this invention. This polymerization, when necessary, may be carried out in an inert solvent such as, for example, butyl acetate. In this case, it is recommendable to use as the polymerization catalyst (catalyst for conversion into cyanurate) such a well-known catalyst as Mannich base or an alkali metal salt of a fatty acid.

In accordance with this invention, the aforementioned aromatic diisocyanate polymer is converted into a randomly blocked aromatic diisocyanate polymer by having the free isocyanate groups thereof blocked with an alkyl phenol blocking agent comprising at least two members selected from the group consisting of mono- and di-alkyl phenols. The mono- and di-alkyl phenols which can be used for the preparation of the blocking agent include monoalkyl phenols such as cresol, n-propyl phenol, n-butyl phenol, n-octyl phenol, n-nonyl phenol, 1-propyl phenol, t-butyl phenol, sec-butyl phenol, and 2-ethylhexyl phenol, and dialkyl phenols such as xylenol, di-n-propyl phenol, di-n-butyl phenol, dioctyl phenol, dinonyl phenol, diisopropyl phenol, di-t-butyl phenol, di-sec-butyl phenol, di-2-ethylhexyl phenol, and isopropyl cresol, for example.

In accordance with this invention, it is necessary that the aforementioned alkyl phenol blocking agent to be used in blocking the free isocyanate groups of the aromatic diisocyanate polymer should comprise at least two different alkyl phenols. These at least two different alkyl phenols may be selected from among monoalkyl phenols or from among dialkyl phenols. It is also permissible to select these two different alkyl phenols, at least one each from among monoalkyl phenols and from among dialkyl phenols. In the aromatic diisocyanate polymer which has been blocked with this alkyl phenol blocking agent, therefore, at least two different alkyl phenols are present in a randomly bound state without fail. In this respect, the aromatic diisocyanate polymer of this invention differs from the conventional blocked aromatic diisocyanate polymer. Desirably, the blocking agent is used in an equivalent weight relative to the free isocyanate groups of the aromatic diisocyanate polymer.

The aromatic diisocyanate polymer randomly blocked with the alkyl phenol blocking agent desirably possesses a molecular weight generally in the range of 900 to 33,000 and an average molecular weight in the range of 1,000 to 15,000. If the average molecular weight of the aromatic diisocyanate polymer randomly blocked with the alkyl phenol blocking agent is less than 1,000, the coating produced by applying the plastisol composition to a given surface has drawbacks such as manifesting insufficient adhesiveness, exhibiting poor weatherability, and succumbing to the phenomenon of yellowing.

Desirably, the amount of the aromatic diisocyanate polymer randomly blocked with the alkyl phenol blocking agent to be used in this invention is in the range of 0.5 to 20 parts by weight, preferably 1 to 10 parts by weight, based on 100 parts by weight of the vinyl chloride type polymer.

The plastisol composition of the present invention uses as the adhesiveness-improving agent therefor the aforementioned aromatic diisocyanate polymer randomly blocked with the alkyl phenol blocking agent. When the plastisol composition is applied to a metallic surface or to a coated surface of metal and the applied coating is baked, therefore, the alkyl phenols used in the aforementioned random blocking must be dissociated. Generally, this dissociation is effected by application of heat. Since this dissociation necessitates protracted exposure of the alkyl phenols to an elevated temperature, this inconvenience is precluded by the use of a thermal dissociation-promoting agent.

The thermal dissociation-promoting agents which can be used in this invention include inorganic and organic metal compounds such as, for example, potassium and sodium salts of alkylsulfuric acids and alkylsulfonic acids, sodium, potassium, cadmium, barium, calcium, and zinc salts of fatty acids of 8 to 20 carbon atoms, and tin compounds such as dibutyl tin laurate, dioctyl tin maleate, dibutyl dibutoxy tin, and bis(2-ethylhexyl) tin oxide. These agents may be used either singly or in the form of a mixture of two or more members. Among other compounds cited above, tin compounds prove particularly desirable.

The amount of the thermal dissociation-promoting agent to be used is not specifically defined but may be varied depending on the particular kind of agent to be selected. Generally, this agent must be used in an amount not so large as to jeopardize the shelf life storage stability of the plastisol composition. Desirably, this agent is used in an amount in the range of 0.05 to 5 parts by weight, preferably 0.2 to 2 parts by weight, based on 100 parts by weight of the vinyl chloride type polymer.

In addition to the components described above, the plastisol composition of the present invention may incorporate therein desired additives such as, for example, filler, thickener, stabilizer, and adsorbent. The fillers which are usable herein include kaolin, diatomaceous earth, and talc, for example. The thickening agents which are usable herein include bentonite, anhydrous silica, and metallic soaps, for example. Metallic soaps are usable also as stabilizers. Concrete examples of metallic soaps are zinc stearate, calcium stearate, and barium oleate. These stabilizers may be used either singly or in the form of a mixture of two or more members. Where the plastisol composition contains water, a powder of magnesium oxide, calcium oxide, or silicon oxide can be used as an adsorbent in the composition.

The production of the plastisol composition of this invention is accomplished by homogeneously mixing the vinyl chloride type polymer and the plasticizer mentioned above with the adhesiveness-improving agent and the thermal dissociation-promoting agent both according with this invention, optionally further with other additives, and defoaming the resultant mixture.

The plastosol composition of this invention can be utilized as a sealant, a coating material, or an adhesive agent for the protection of substrates of products manufactured in the automobile industry and other various industries. Particularly in the automobile industry, it is utilized on an automobile body subjected in advance to cationic electrodeposition for the purpose of rustproofing the automobile body, enabling the coated body to absorb the impact of pebbles hurled by the automobile tires while the automobile is traveling on the road, and stopping up pinholes.

The amount of the plastisol composition of this invention to be applied to a surface need not be specifically defined but may be varied widely depending on the purpose use. When it is used as an undercoating material for permitting application of an overcoating material, it is desirably applied in a thickness in the range of 0.5 to 5 mm.

For the application of the plastisol composition to a surface, any of the conventional methods which suits the purpose of use may be adopted. The methods which are usable herein include dip coating, spraying, and brush coating, for example.

The plastisol composition of this invention applied to a given substrate can be hardened into a solid coating generally by a heat treatment performed at a temperature in the range of 120° to 140° C. for a period in the range 15 to 30 minutes.

Since the plastisol composition of this invention incorporates therein as an adhesiveness-improving agent the aromatic diisocyanate polymer randomly blocked with an alkyl phenol blocking agent comprising at least two members selected from the group consisting of monoalkyl phenols and dialkyl phenols, it can be easily and firmly attached to a metallic surface or a coated surface of metal, particularly to a coated surface of large thickness formed by cationic electrodeposition and permitting no easy adhesion (incapable of generating adhesive strength), by a heat treatment to be performed at a low temperature for a short period such as, for example, at 120° to 140° C. for 15 to 30 minutes.

The plastisol composition of this invention has as much facility for handling as the conventional plastisol composition, displays no noticeable increase of viscosity even after a protracted standing at rest, refrains from coloration due to the heat treatment to be performed during the production of the composition or after the application to a given surface, and avoids causing discoloration in an overcoating material superposed in a small thickness.

Now, the present invention will be described hereinafter with reference to working examples and referential examples. The terms "part" and "%" used therein refer to "part by weight" and "% by weight" unless otherwise specified.

REFERENTIAL EXAMPLE

Production of aromatic diisocyanate polymer randomly blocked with a blocking agent comprising at least two members selected from the group consisting of mono- and di-alkyl phenols. (Production of randomly blocked aromatic diisocyanate polymer)

In a flask provided with a stirrer, a thermometer, and a nitrogen-introducing tube, 100 parts of tolylene diisocyanate, 400 parts of dioctyl phthalate, and 0.6 part of potassium caprylate as a polymerizing (cyanurating) catalyst were heated and stirred under a current of nitrogen at a temperature in the range of 25° to 60° C. until the ensuing reaction proceeded to the extent of elevating the isocyanate content to 3.2% and producing a polymer (cyanurate).

Then, the polymer, 54.8 parts of isopropyl phenol and 23.7 parts of isooctyl phenol jointly as a blocking agent, 314 parts of dioctyl phthalate, and 0.3 part of dibutyl tin laurate were heated under a current of nitrogen at a temperature in the range of 50° to 80° C. until the ensuing reaction proceeded to the extent of ceasing the absorption of the NCO group at 2,260 cm$^{-1}$ in the IR spectrum and producing a dioctyl phthalate solution containing 20% of tolylene diisocyanate polymer randomly blocked with an alkyl phenol blocking agent comprising isopropyl phenol and isooctyl phenol. This dioctyl phthalate solution was used as an adhesiveness-improving agent (A).

By following the procedure described above, randomly blocked tolylene diisocyanate polymers B to L were produced by using a varying blocking agent indicated in Table 1 below.

TABLE 1

| Blocking agent | Mixing ratio (%) | Adhesiveness-improving agent |
|---|---|---|
| Isopropyl phenol | 80 | A |
| Isooctyl phenol | 20 | |
| Isopropyl phenol | 80 | B |
| Nonyl phenol | 20 | |
| Isopropyl phenol | 80 | C |
| Dinonyl phenol | 20 | |
| Isopropyl phenol | 80 | D |
| Di-t-butyl phenol | 20 | |
| t-Butyl phenol | 80 | E |
| Isooctyl phenol | 20 | |
| t-Butyl phenol | 80 | F |
| Nonyl phenol | 20 | |
| t-Butyl phenol | 80 | G |
| Di-t-butyl phenol | 20 | |
| t-Butyl phenol | 80 | H |
| Dinonyl phenol | 20 | |
| Xylenol | 75 | I |
| t-Butyl phenol | 25 | |
| Xylenol | 75 | J |
| Nonyl phenol | 25 | |
| Xylenol | 75 | K |
| Dinonyl phenol | 25 | |
| Xylenol | 75 | L |
| Di-t-butyl phenol | 25 | |

COMPARATIVE REFERENTIAL EXAMPLE

In accordance with the procedure of the Referential Example described above, dioctyl phthalate solutions of independently blocked tolylene diisocyanate polymers, M to P indicated in Table 2, were prepared by using one varying monoalkyl phenol or one varying dialkyl phenol alone as a blocking agent. Separately, the solutions M and O and the solutions of N and P were severally mixed mechanically to prepare adhesiveness-improving agents Q and R.

TABLE 2

| Blocking agent | Mixing ratio (%) | Adhesiveness-improving agent |
|---|---|---|
| Isopropyl phenol | 100 | M |
| t-Butyl phenol | 100 | N |
| Isooctyl phenol | 100 | O |
| Dinonyl phenol | 100 | P |
| Isopropyl phenol | 80 | Q |
| Isooctyl phenol | 20 | |
| t-Butyl phenol | 80 | R |

TABLE 2-continued

| Blocking agent | Mixing ratio (%) | Adhesiveness-improving agent |
|---|---|---|
| Dinonyl phenol | 20 | |

EXAMPLE 1

Production of plastisol composition

In a kneader, 100 parts of vinyl chloride polymer (produced by Nippon Zeon Co., Ltd. and marketed under trademark designation of Zeon 37J), 130 parts of dioctyl phthalate, 200 parts of calcium carbonate, 5 parts of a stabilizer ($PbSO_4$), 28 parts of the adhesiveness-improving agent A obtained in the Referential Example, and 2 parts of dibutyl tin laurate were mixed at normal room temperature for 30 minutes and then defoamed, to produce plastisol composition 1.

EXAMPLE 2

Plastisol composition 2 was produced by following the procedure of Example 1, excepting a mixture consisting of 80 parts of Zeon 37J and 20 parts of Zeon 121 (produced by Nippon Zeon Co., Ltd.) was used in the place of the vinyl chloride polymer.

EXAMPLES 3 to 13

In accordance with the procedure of Example 1, plastisol compositions 3 to 13 were produced by using 100 parts of the mixture of vinyl chloride polymers of Example 2 and, in the place of the adhesiveness-improving agent A of Example 1, the aforementioned adhesiveness-improving agents B to L in the same amount.

COMPARATIVE EXPERIMENTS 1 to 6

Comparative plastisol compositions 1 to 6 were produced by following the procedure of Example 1, excepting the adhesiveness-improving agents M to R of Comparative Referential Example were used in the same amount in the place of the adhesiveness-improving agent A.

TEST EXAMPLE

The plastisol compositions of Examples 1 to 13 and Comparative Experiments 1 to 6 were evaluated as follows.

(1) Test of plastisol composition for storage stability

A given plastisol composition was tested with a Brookfield BH type viscometer for viscosity at 20° C. The numerical value consequently found was recorded as initial viscosity. Then, the sample was placed in a glass container, left standing in a thermostatic bath at 40° C.±1° C. for seven days and then tested again for viscosity in the same manner. The numerical value consequently found was recorded as an increment of viscosity.

(2) Test for tensile shear strength

On a plate coated by cationic electrodeposition and used as a substrate, a given plastisol composition was tested for shear strength in accordance with Japanese Industrial standard (JIS) K 6830 (method for testing automobile sealant). The film of the plastisol formed on the substrate had a thickness of 0.2 mm. The heat treatment was carried out at 120 for 30 minutes. The stretching rate was 25 mm/min.

(3) Condition of shear face

This condition was evaluated by visual observation.

(4) Test of coating for discoloration

On a plate coated by cationic electrodeposition and used as a substrate, a given plastisol composition was applied in a thickness of 5 mm, heat-treated at 140° C. for 10 minutes, covered with an overcoating material (produced by Kansai Paint Co., Ltd. and marketed under trademark designation of "Super White 326") applied in a thickness of 5μ, and again heat-treated at 140° C. for 20 minutes, to produce a test piece. This test piece was given 200 hours' exposure test in a Fade-O-Meter and then tested for discoloration. The results of these tests were as shown in Table 3.

TABLE 3

| Component | Example 1 | 2 | 3 | 4 | 5 | 6 |
|---|---|---|---|---|---|---|
| Zeon 37J | 100 | 80 | 80 | 80 | 80 | 80 |
| Zeon 121 | — | 20 | 20 | 20 | 20 | 20 |
| Dioctyl phthalate | 130 | 130 | 130 | 130 | 130 | 130 |
| Calcium carbonate | 200 | 200 | 200 | 200 | 200 | 200 |
| $PbSO_4$ | 5 | 5 | 5 | 5 | 5 | 5 |
| Dibutyl tin laurate | 2 | 2 | 2 | 2 | 2 | 2 |
| Adhesiveness-improving agent | | | | | | |
| A | 28 | 28 | — | — | — | — |
| B | — | — | 28 | — | — | — |
| C | — | — | — | 28 | — | — |
| D | — | — | — | — | 28 | — |
| E | — | — | — | — | — | 28 |
| Storage stability | | | | | | |
| Initial viscosity (cps) | 15400 | 15100 | 14500 | 14000 | 14400 | 14900 |
| Viscosity (cps) after 7 days' at 40° C. | 17200 | 17100 | 15300 | 15800 | 16400 | 17000 |
| Increment of viscosity (%) | 12.2 | 13.9 | 13.1 | 12.8 | 13.9 | 14.1 |
| Shear strength (kg/cm²) | 46.8 | 44.8 | 43.2 | 40.0 | 38.4 | 39.1 |
| Condition of shear face | Broken cohesion | Broken cohesion | Broken cohesion | Broken cohesion | Broken cohesion | Broken cohesion |
| Discoloration of overcoating (1) | | | | | | |

| Component | Example 7 | 8 | 9 | 10 | 11 | 12 | 13 |
|---|---|---|---|---|---|---|---|
| Zeon 37J | 80 | 80 | 80 | 80 | 80 | 80 | 80 |
| Zeon 121 | 20 | 20 | 20 | 20 | 20 | 20 | 20 |

TABLE 3-continued

| | | | | | | | |
|---|---|---|---|---|---|---|---|
| Dioctyl phthalate | 130 | 130 | 130 | 130 | 130 | 130 | 130 |
| Calcium carbonate | 200 | 200 | 200 | 200 | 200 | 200 | 200 |
| PbSO$_4$ | 5 | 5 | 5 | 5 | 5 | 5 | 5 |
| Dibutyl tin laurate | 2 | 2 | 2 | 2 | 2 | 2 | 2 |
| Adhesiveness-improving agent | | | | | | | |
| F | 28 | — | — | — | — | — | — |
| G | — | 28 | — | — | — | — | — |
| H | — | — | 28 | — | — | — | — |
| I | — | — | — | 28 | — | — | — |
| J | — | — | — | — | 28 | — | — |
| K | — | — | — | — | — | 28 | — |
| L | — | — | — | — | — | — | 28 |
| Storage stability | | | | | | | |
| Initial viscosity (cps) | 14500 | 15000 | 14100 | 14900 | 14000 | 13700 | 14000 |
| Viscosity (cps) after 7 days' at 40° C. | 16450 | 17000 | 16000 | 17100 | 16000 | 15700 | 16100 |
| Increment of viscosity (%) | 13.4 | 13.3 | 13.5 | 14.8 | 14.3 | 14.6 | 15.0 |
| Shear strength (kg/cm$^2$) | 39.3 | 43.9 | 38.1 | 38.0 | 44.5 | 41.1 | 41.6 |
| Condition of shear face | Broken cohesion | Broken cohesion | Broken cohesion | Broken cohesion | Broken cohesion | Broken cohesion | Broken cohesion |
| Discoloration of overcoating (1) | | | | | | | |

| | Comparative Experiment | | | | | |
|---|---|---|---|---|---|---|
| Component | 1 | 2 | 3 | 4 | 5 | 6 |
| Zeon 37J | 80 | 80 | 80 | 80 | 80 | 80 |
| Zeon 121 | 20 | 20 | 20 | 20 | 20 | 20 |
| Dioctyl phthalate | 130 | 130 | 130 | 130 | 130 | 130 |
| Calcium carbonate | 200 | 200 | 200 | 200 | 200 | 200 |
| PbSO$_4$ | 5 | 5 | 5 | 5 | 5 | 5 |
| Dibutyl tin laurate | 2 | 2 | 2 | 2 | 2 | 2 |
| Adhesiveness-improving agent | | | | | | |
| M | 28 | — | — | — | — | — |
| N | — | 28 | — | — | — | — |
| O | — | — | 28 | — | — | — |
| P | — | — | — | 28 | — | — |
| Q | — | — | — | — | 28 | — |
| R | — | — | — | — | — | 28 |
| Storage stability | | | | | | |
| Initial viscosity (cps) | 16100 | 15500 | 14100 | 14000 | 14300 | 13300 |
| Viscosity (cps) after 7 days' at 40° C. | 18900 | 18000 | 16900 | 16100 | 16500 | 15100 |
| Increment of viscosity (%) | 17.4 | 16.1 | 19.9 | 15.0 | 14.3 | 13.5 |
| Shear strength (kg/cm$^2$) | 33.1 | 30.8 | 25.0 | 32.5 | 30.2 | 28 |
| Condition of shear face | Broken cohesion | Broken cohesion | Broken cohesion | Broken cohesion | Partial breakage of boundary | Partial breakage of boundary |
| Discoloration of overcoating (1) | | | | | | Δ |

The adhesiveness-improving agent was used in the form of a 20% solution in DOP.

(1) o=Absence of coloration, Δ=partial coloration, and x=heavy coloration.

The test data given above clearly indicate that the plastisol compositions according to the present invention exhibit highly satisfactory adhesiveness (shear strength).

What we claim is:

1. A plastisol composition containing a vinyl chloride homopolymer or copolymer, a plasticizer, an adhesiveness-improving agent, and a thermal dissociation-promoting agent, said adhesiveness-improving agent being an aromatic diisocyanate polymer randomly blocked with an alkyl phenol blocking agent comprising at least two different members selected from the group consisting of mono- and di-alkylphenols.

2. A plastisol composition according to claim 1 wherein the monomeric component of the aromatic diisocyanate is selected from the group consisting of tolylene diisocyanate, diphenyl methane diisocyanate, xylylene diisocyanate and mixtures of two or more of them.

3. A plastisol composition according to claim 1 wherein the monoalkyl phenol is selected from the group consisting of cresol, n-propyl phenol, n-butyl phenol, n-octyl phenol, n-nonyl phenol, 1-propyl phenol, t-butyl phenol, sec-butyl phenol and 2-ethylhexyl phenol.

4. A plastisol composition according to claim 1 wherein the dialkyl phenol is selected from the group consisting of xylenol, di-n-propyl phenol, di-n-butyl phenol, dioctyl phenol, dinonyl phenol, diisopropyl phenol, di-t-butyl phenol, di-sec-butyl phenol, di-2-ethylhexyl phenol and isopropyl cresol.

5. A plastisol composition according to claim 1 wherein the aromatic diisocyanate polymer randomly blocked with at least two alkyl phenols has a molecular weight of 900 to 33,000.

* * * * *